US008824352B2

(12) United States Patent
Yan et al.

(10) Patent No.: US 8,824,352 B2
(45) Date of Patent: Sep. 2, 2014

(54) MOBILE ACCESS GATEWAY, MOBILE NODE AND METHOD FOR PROCESSING HANDOVER STATE INFORMATION

(75) Inventors: Wei Yan, Shenzhen (CN); Chunqiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 769 days.

(21) Appl. No.: 12/965,316

(22) Filed: Dec. 10, 2010

(65) Prior Publication Data

US 2011/0083048 A1 Apr. 7, 2011

Related U.S. Application Data

(63) Continuation of application No. PCT/CN2009/071638, filed on May 5, 2009.

(30) Foreign Application Priority Data

Jun. 12, 2008 (CN) .......................... 2008 1 0114796

(51) Int. Cl.
| | |
|---|---|
| *G06F 11/07* | (2006.01) |
| *H04W 36/00* | (2009.01) |
| *H04W 88/02* | (2009.01) |
| *H04W 8/08* | (2009.01) |
| *H04W 88/16* | (2009.01) |
| *H04W 80/04* | (2009.01) |
| *H04W 8/22* | (2009.01) |

(52) U.S. Cl.
CPC .......... *H04W 36/0016* (2013.01); *H04W 88/02* (2013.01); *H04W 8/087* (2013.01); *H04W 88/16* (2013.01); *H04W 80/04* (2013.01); *H04W 8/22* (2013.01)
USPC .......................................... 370/313; 370/331

(58) Field of Classification Search
CPC ................................................. H04W 36/0016
USPC .............. 370/338, 328, 331; 726/12; 713/170
See application file for complete search history.

(56) References Cited

U.S. PATENT DOCUMENTS

| | | | |
|---|---|---|---|
| 7,152,238 B1 | 12/2006 | Leung et al. | |
| 2003/0099219 A1* | 5/2003 | Abrol et al. | 370/338 |

(Continued)

FOREIGN PATENT DOCUMENTS

| | | |
|---|---|---|
| CN | 1784059 A | 6/2006 |
| CN | 1823545 A | 8/2006 |
| WO | 2005/002266 A1 | 1/2005 |

OTHER PUBLICATIONS

Office Action issued in corresponding Chinese Patent Application No. 200810114796.8, mailed Oct. 8, 2012.

(Continued)

*Primary Examiner* — Asad Nawaz
*Assistant Examiner* — Parth Patel
(74) *Attorney, Agent, or Firm* — Brinks Gilson & Lione (57) ABSTRACT

A method for processing handover state information, a mobile access gateway (MAG), and a mobile node (MN) are disclosed. The method includes: receiving a handover state notification message, where the handover state notification message includes interface handover indication information; determining a handover indication option value according to the interface handover indication information; and generating and sending a proxy binding update (PBU) message, where the PBU message includes the handover indication option value. With the present invention, a MAG can obtain the handover state information of an MN through the interface handover indication information of the MN. The application scope is wide, and the access success probability is increased; therefore, the access quality of service (QoS) provided for the user is improved.

3 Claims, 6 Drawing Sheets

(56) References Cited

U.S. PATENT DOCUMENTS

| | | | |
|---|---|---|---|
| 2003/0179753 | A1 | 9/2003 | Mercuriali |
| 2003/0227937 | A1 | 12/2003 | Abrol et al. |
| 2004/0090937 | A1 | 5/2004 | Chaskar et al. |
| 2004/0264476 | A1 | 12/2004 | Alarcon et al. |
| 2005/0076108 | A1 | 4/2005 | Li et al. |
| 2006/0023668 | A1 | 2/2006 | Ramaswamy et al. |
| 2007/0297377 | A1* | 12/2007 | McCann et al. ............ 370/338 |
| 2009/0003263 | A1* | 1/2009 | Foster et al. ............... 370/328 |
| 2009/0016270 | A1* | 1/2009 | Tsirtsis (Georgios) et al. ............... 370/328 |
| 2009/0094693 | A1* | 4/2009 | Patil ............................. 726/12 |
| 2010/0272061 | A1* | 10/2010 | Muhanna et al. ........... 370/331 |
| 2010/0313024 | A1* | 12/2010 | Weniger et al. ............. 713/170 |
| 2011/0051689 | A1* | 3/2011 | Premec et al. .............. 370/331 |

OTHER PUBLICATIONS

Office Action issued in corresponding Chinese Patent Application No. 200810114796.8, mailed Dec. 23, 2011.

Written Opinion of the International Searching Authority issued in corresponding PCT Patent No. PCT/CN2009/071638, mailed Aug. 13, 2009.

Chinese Patent No. 101605319, issued on Apr. 17, 2013, granted in corresponding Chinese Patent Application No. 200810114796.8, 1 page.

Supplementary European Search Report issued in corresponding European Patent Application No. 09 76 1 56; dated Sep. 23, 2011.

Office Action issued in corresponding European Patent Application No. 09 761 256.8; dated Jun. 15, 2012.

Sarikaya, B. et al. "PMIPv6 Route Optimization Protocol draft—qin-netlmm-pmipro-00.txt." The IETF Trust. Feb. 11, 2008.

Sarikaya, B. et al. "Proxy Mobile IPv6 Inter-Technology Handover Issue draft—Sarikaya-netlmm-itho-00." IETF Task Force. Jun. 13, 2008.

Solomon, J. et al. "Mobile-IPv4 Configuration Option for PPP IPCP" The Internet Society. Feb. 1998.

Devarapalli, V. et al. "Multiple Interface Support with Proxy Mobile IPv6—draft-devarapalli-netlmm-multihoming-02.txt." The IEFT Trust. Feb. 25, 2008.

Gundavelli, S. et al. "Proxy Mobile IPv6 — draft-ietf-netlmm-proxymip6-11.txt." The IEFT Trust. Feb. 25, 2008.

Muhanna, a. et al. "Proxy MIPv6 Support for Mobile Nodes with Multihoming draft-muhanna-netlmm-multihoming-support-00.txt" The IETF Trust. Feb. 11, 2007.

Jeyatharan, M. et al. "Multiple Interfaced Mobile Nodes in Net LMM—draft jeyatharan-netlamn-multi-interface-ps-01." The IETF Trust. Jan. 2008.

International Search Report issued in corresponding PCT Application No. PCT/CN2009/071638; mailed Aug. 13, 2009.

* cited by examiner

MOBILE ACCESS GATEWAY, MOBILE NODE AND METHOD FOR PROCESSING HANDOVER STATE INFORMATION

CROSS-REFERENCE TO RELATED APPLICATIONS

This patent document is a continuation of International Application No. PCT/CN2009/071638, filed on May 5, 2009, which claims priority to Chinese Patent Application No. 200810114796.8, filed on Jun. 12, 2008, both of which are hereby incorporated by reference in their entireties.

TECHNICAL FIELD

The disclosure presented herein relates to the field of communications technologies, and in particular, to a mobile access gateway (MAG), a mobile node (MN) and a method for processing handover state information.

BACKGROUND

The Proxy Mobile Internet Protocol version 6 (PMIPv6) provides a network-based mobility management protocol. An MN does not need to participate in any mobility management signaling on a PMIPv6 network. A mobility entity on the network traces mobility of the MN, initializes mobility signaling, and sets up routing information required for communication.

Figure 1:
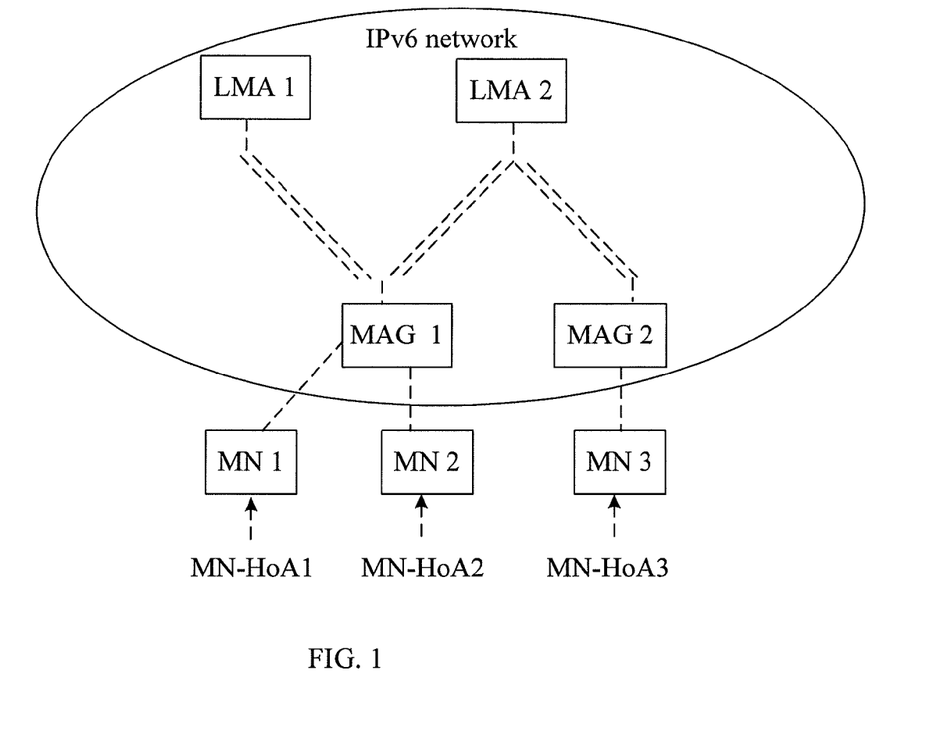
FIG. 1 shows the structure of a PMIPv6 network system in the prior art.

FIG. 1 shows the structure of a PMIPv6 network system in the prior art. As shown in FIG. 1, the network system includes a local mobility anchor (LMA), a MAG, and an MN. The LMA on the PMIPv6 network maintains the reachability state of the MN and acts as an anchor of a home network prefix (HNP) of the MN on the topology. The MAG is an entity that represents the MN to implement mobility management. The MAG detects mobility of the MN on an access link and sends a proxy binding update (PBU) message to the LMA corresponding to the MN. When the MN accesses the PMIPv6 network, the MAG on the access link determines, after identifying the MN and obtaining its ID, whether the MN is authorized with the network mobility management service. If the system needs to provide the network mobility management service for the MN, it ensures that the MN can use any address configuration mechanism allowed by the network so that the MN obtains the address configuration on an interface and moves anywhere on the PMIPv6 network. The address configuration obtained by the MN includes the address of the HNP, address of the default router on the link, and configuration of related parameters. From the perspective of the MN, the entire PMIPv6 network can be regarded as a single link. The system ensures that the address obtained by the MN does not change and always considers that the MN is on a same link. If the MN is connected to the PMIPv6 network through multiple interfaces, the LMA allocates a unique HNP to each interface so that each interface configures its home address (HoA) according to its HNP. If the MN hands over from one interface to another interface on a same PMIPv6 network, the LMA allocates a same HNP to the new interface. As a topological anchor of the MN, the LMA receives any encapsulated packets sent to the MN. After receiving an encapsulated packet whose destination address prefix is the HNP of the MN, the LMA forwards the encapsulated packet to the MAG through a tunnel. After receiving the encapsulated packet, the MAG decapsulates it and sends the decapsulated packet to the MN. As the default gateway of the MN, after receiving any encapsulated packet sent to a correspondent node (CN), the MAG forwards the encapsulated packet to the LMA through a tunnel. After receiving the encapsulated packet, the LMA decapsulates it and sends the decapsulated packet to the destination CN.

When the access link of the MN changes, a MAG on a new access link sends signaling to the LMA to update binding information on the LMA. The MAG on the new link sends a router advertisement (RA) message carrying a corresponding HNP to the MN, so that the MN believes that it is still on the same link. In addition, the MN uses the same address configuration on the new access link. Therefore, the MAG needs to notify the LMA of a handover state of the MN through a PBU message, so that the LMA performs a corresponding operation according to the handover state of the MN. In the prior art, the method for a MAG to obtain a handover state of an MN includes that: a new MAG may obtain the handover state of the MN from an old MAG through context transmission between the MAGs; or the new MAG uses an Authentication, Authorization and Accounting (AAA) architecture to obtain the handover state of the MN from the AAA server.

SUMMARY

Embodiments of the present invention provide a MAG, an MN, and a method for processing handover state information. The embodiments overcome the defects of the technical solution of the prior art such as a narrow application scope and certain limitations. When an MN accesses a PMIPv6 network or performs a handover on a PMIP network and before a MAG, in place of the MN, registers with an LMA, the MAG can obtain handover state information of the MN according to interface handover indication information of the MN.

In the process of implementing the present invention, a context interface between the MAGs is required when the handover state of the MN may be obtained through context transmission between the MAGs, so that the new MAG obtains related information such as a handover indication from the old MAG. In certain scenarios, for example, heterogeneous network handover, and no security association between the MAGs, the operation may not be performed as expected. When an AAA architecture is adopted to obtain the handover state of the MN, the operation cannot be performed in a scenario where an AAA server does not store the related interface information or the AAA architecture is not adopted. The application scope of the technical solution of the prior art is narrow, there are certain limitations, and the quality of service (QoS) is poor.

A method for processing handover state information includes:

receiving a handover state notification message, where the handover state notification message includes interface handover indication information;

determining a handover indication option value according to the interface handover indication information; and generating and sending a PBU message, where the PBU message includes the handover indication option value.

A MAG includes:

a first receiving module, configured to receive a handover state notification message, where the handover state notification message includes interface handover indication information;

a determining module, configured to determine a handover indication option value according to the interface handover indication information; and a first sending module, configured to generate and send a PBU message, where the PBU message includes the handover indication option value.

An MN includes:

a second sending module, configured to send a handover state notification message, where the handover state notification message includes interface handover indication information; and a second receiving module, configured to receive an RA message returned according to the interface handover indication information, where the RA message includes an HNP allocated to the MN.

Embodiments of the present invention provide a MAG, an MN, and a method for processing handover state information. The MN sends a handover state notification message carrying interface handover indication information to the MAG to notify the MAG of a handover state of the MN. The MAG receives the handover state notification message and configures a PBU message according to the interface handover indication information. Thus, the MAG can obtain the handover state information of the MN according to the interface handover indication information of the MN. The access success probability of a user is increased, and the application scope is wide; therefore, the access QoS provided for the user is improved.

DETAILED DESCRIPTION OF THE EMBODIMENTS

The technical solution of the present invention is hereinafter described in detail with reference to accompanying drawings and embodiments.

Figure 2:
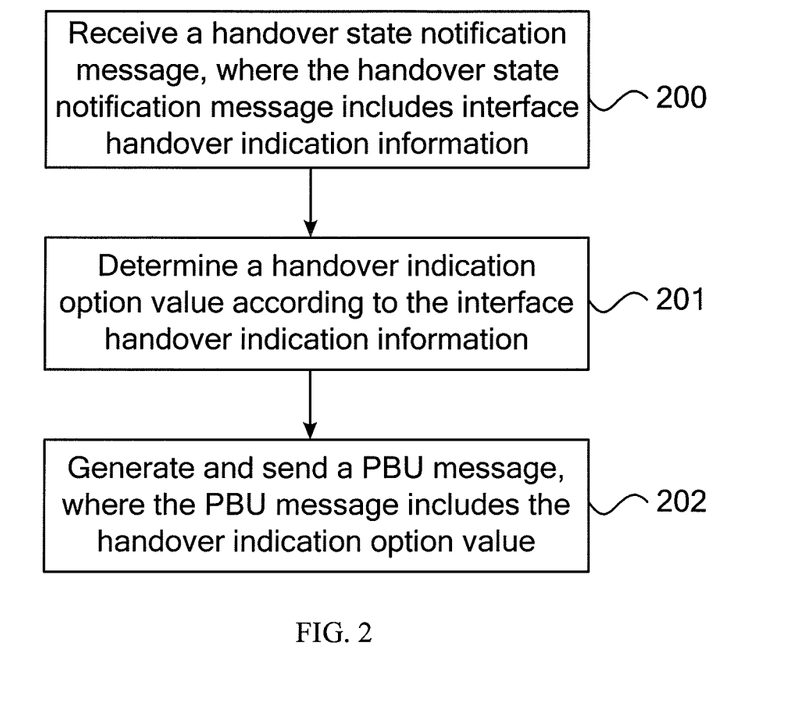
FIG. 2 is a flowchart of a method for processing handover state information according to a first embodiment of the present disclosure.

FIG. 2 is a flowchart of a method for processing handover state information according to a first embodiment of the present invention. As shown in FIG. 2, the method for processing handover state information includes:

200. Receive a handover state notification message, where the handover state notification message includes interface handover indication information;

In the PMIPv6 network, when an interface of an MN that accesses the PMIPv6 network hands over, the interface handover state needs to be sent to a MAG. The MAG receives a handover state notification message sent by the MN. The handover state notification message may include interface handover indication information of the MN. The interface handover indication information is used for identifying the state of the handover for the MN to access the MAG. The handover state notification message may be a router solicitation (RS) message or a first configuration request. The interface handover indication information may identify: an attachment over a new interface; a handover from a first interface of the MN to a second interface of the MN; or a handover between different MAGs over a same interface. The attachment over a new interface may include two cases: an attachment over any interface of a new MN; and an attachment over a new interface of an MN that has accessed the MAG. The handover from the first interface of the MN to the second interface of the MN may include two cases: a handover of the same MN from the first interface to the second interface to access a same MAG; and a handover of the same MN from the first interface to the second interface to access another MAG. Specifically, the handover between different MAGs over a same interface is a handover of the same MN to a different MAG over a same interface.

201. Determine a handover indication option value according to the interface handover indication information.

After receiving the handover state notification message sent by the MN, the MAG determines a handover indication option value according to the interface handover indication information carried in the handover state notification message. Specifically, the step includes case 1 and case 2.

Case 1. When the handover state notification message sent from the MN to the MAG is an RS message, the method for determining a handover indication option value according to the interface handover indication information may be:

(1) when the interface handover indication information carried in the handover state notification message identifies an attachment over a new interface, determining a handover indication option value is instructing an LMA to allocate a unique HNP to the MN;

(2) when the interface handover indication information carried in the handover state notification message identifies a handover from a first interface of the MN to a second interface of the MN, determining a handover indication option value is instructing an LMA to allocate a same HNP used by the first interface to the MN; or (3) when the interface handover indication information carried in the handover state notification message identifies a handover between different MAGs over a same interface, determining a handover indication option value is instructing an LMA to allocate a same HNP used by the same interface to the MN.

Case 2. When the handover state notification message sent from the MN to the MAG is a first configuration request, the MAG judges whether the interface handover indication information carried in the first configuration request identifies a handover of the same MN from the first interface to the second interface, or a handover between different MAGs over a same interface and judges whether the MAG stores a HoA used before the handover of the MN. When the interface handover indication information identifies a handover of the same MN from the first interface to the second interface, or a handover between different MAGs over a same interface and the MAG stores a HoA used before the handover of the MN, the MAG returns a HoA used before the handover of the MN to the MN. The step of judging whether the interface handover indication information identifies a handover of the same MN from the first interface to the second interface, or a handover between different MAGs over a same interface and the step of judging whether the MAG stores a HoA used before the handover of the MN are not order-sensitive. Specifically, the step of returning the HoA by the MAG to the MN may be that the MAG returns a Point-to-Point Protocol (PPP) negative acknowledgment (NAK) message to the MN, where the PPP NAK message includes the HoA used before the handover of the MN. After receiving the PPP NAK message, the MN generates a second configuration request carrying the interface handover indication information and the HoA used before the handover of the MN according to the PPP NAK message and sends the second configuration request to the MAG. After receiving the second configuration request sent by the MAG and learning that the carried HoA is consistent with the HoA used before the handover of the MN and stored in the MAG, the MAG returns an acknowledgment (ACK) of the second configuration request to the MN. When the interface handover indication information identifies a handover of the same MN from the first interface to the second interface, the HoA used by the MN after the handover is the HoA used by the first interface before the handover. When the interface handover indication information identifies a handover between different MAGs over a same interface, the HoA used by the MN to access the new MAG is the one for accessing the old MAG before the MN hands over from the old MAG to the new MAG over the same interface. The PPP NAK message is a negative acknowledgement of a first configuration request sent by the MN. After receiving the NAK message, the MN needs to send a second configuration request to the MAG and wait for the MAG to return an ACK message.

If it is determined that the MAG does not store the HoA used before the handover of the MN, the MAG returns an ACK of the first configuration request to the MN, indicating that the MAG does not successfully send the HoA used before the handover of the MN to the MN.

After receiving the first configuration request or the second configuration request and returning the ACK message, the method for the MAG to determine a handover indication option value according to the interface handover indication information may be:

(1) when the interface handover indication information carried in the handover state notification message identifies an attachment over a new interface, determining a handover indication option value is instructing an LMA to allocate a unique HNP to the MN;

(2) when the interface handover indication information carried in the handover state notification message identifies a handover from a first interface of the MN to a second interface of the MN, determining a handover indication option value is instructing an LMA to allocate a same HNP used by the first interface to the MN; or (3) when the interface handover indication information carried in the handover state notification message identifies a handover between different MAGs over a same interface, determining a handover indication option value is instructing an LMA to allocate a same HNP used by the same interface to the MN.

202. Generate and send a PBU message, where the PBU message includes the handover indication option value.

After updating the handover indication option value according to the interface handover indication information carried in the handover state notification message, the MAG generates a PBU message carrying the handover indication option value and sends the PBU message to the LMA.

After step 202, the LMA receives the PBU message determined according to the interface handover indication information. According to the handover indication option value carried in the PBU message, the LMA may perform one of the following three operations:

(1) When the handover indication option value carried in the PBU message identifies an attachment over a new interface, the LMA allocates a unique HNP to the MN and creates a cache binding entry. The unique HNP may be an HNP or an HNP group. That is, the unique HNP may include multiple HNPs.

(2) When the handover indication option value carried in the PBU message identifies a handover from a first interface of the MN to a second interface of the MN, the LMA allocates a same HNP used by the first interface to the MN by comparing the PBU message with a maintained binding cache entry.

(3) When the handover indication option value carried in the PBU message identifies a handover between different MAGs over a same interface, the LMA allocates a same HNP used by the same interface to the MN by comparing the PBU message with a maintained binding cache entry.

Specifically, the process of allocating an HNP to the MN according to the handover indication option value may include that: the LMA sends a proxy binding acknowledgement (PBA) message carrying an HNP to the MAG; and the MAG generates an RA message according to the HNP carried in the PBA message and sends the RA message carrying the HNP to the MN. The MAG receives the PBA message sent by the LMA, where the PBA message carries the HNP allocated to the MN. There may be the following three cases: (1) when the handover indication option value carried in the PBA message identifies an attachment over a new interface, the MAG receives the PBA message sent by the LMA, where the PBA message carries a unique HNP allocated to the MN; (2) when the handover indication option value carried in the PBA message identifies a handover from a first interface of the MN to a second interface of the MN, the MAG receives the PBA message sent by the LMA, where the PBA message carries a same HNP used by the first interface and allocated to the MN; and (3) when the handover indication option value carried in the PBA message identifies a handover between different MAGs over a same interface, the MAG receives the PBA message sent by the LMA, where the PBA message carries a same HNP used by the same interface and allocated to the MN.

When the interface handover indication information identifies an attachment over a new interface, the MN receives an RA message carrying the unique HNP allocated to the MN and configures a corresponding HoA for an interface used for sending a handover state notification message according to the unique HNP. When the interface handover indication information identifies a handover from a first interface of the MN to a second interface of the MN or a handover between different MAGs over a same interface, the MN receives an RA message carrying the HNP used before the handover of the MN and configures a corresponding HoA for the same interface used for sending a handover state notification message according to the HNP. If the message sent from the MN to the MAG is a first configuration request, the MN can check whether the HoA configured on the MN is correct according to the HNP of the MN. If the HoA is incorrect, the MN re-configures a HoA according to the HNP. The MN communicates with the network according to the configured HoA. In the first embodiment of the method for processing handover state information, an MN sends a handover state notification message carrying interface handover indication information to a MAG to notify the MAG of a handover state of the MN. The MAG receives the handover state notification message and configures a PBU message according to the interface handover indication information. Thus, the MAG can obtain the handover state information of the MN according to the interface handover indication information of the MN. The application scope is wide, and the access success probability is increased; therefore, the access QoS provided for the user is improved.

Figure 3:
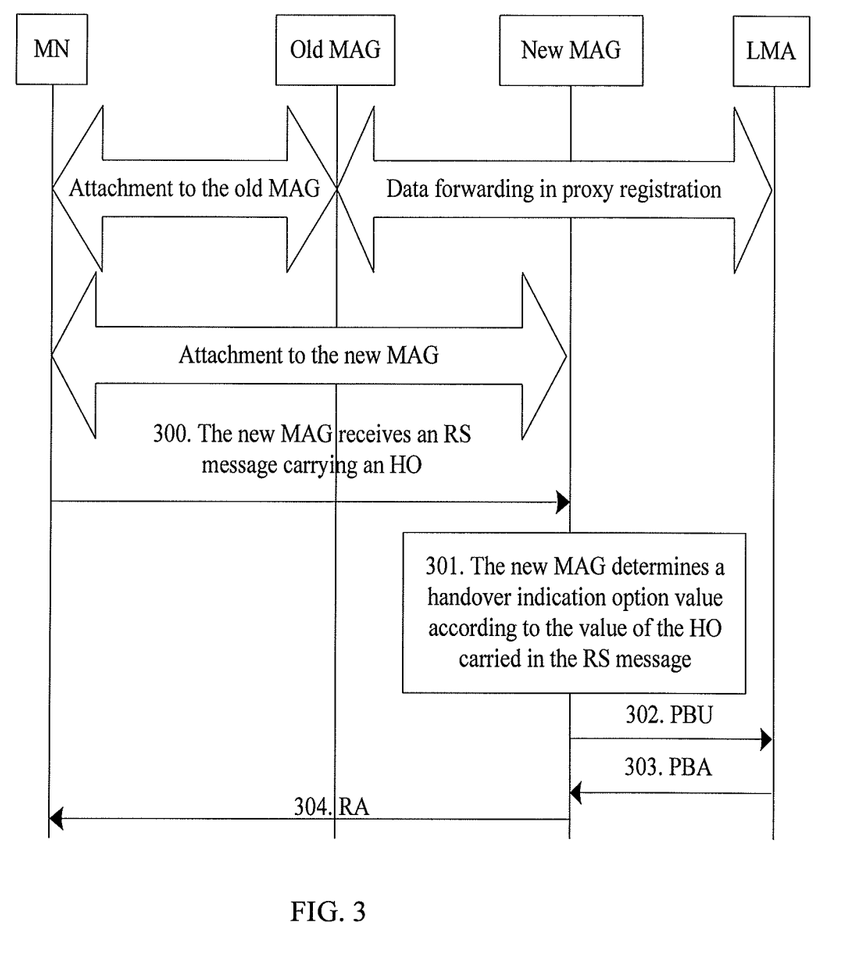
FIG. 3 is a signaling flowchart of a method for processing handover state information according to a second embodiment of the present disclosure.

FIG. 3 is a signaling flowchart of a method for processing handover state information according to a second embodiment of the present invention. The mapping relationship between the embodiment and the first embodiment of the method for processing handover state information is as follows: An MN is a mobile node; a MAG is a mobile access gateway; an LMA is a local mobility anchor; an RS message is a handover state notification message; and an HO (handover) is interface handover indication information carried in the RS message.

As shown in FIG. 3, the method for processing handover state information includes:

300. A new MAG receives an RS message sent by an MN, where the RS message carries interface handover indication information (HO).

The MN notifies the new MAG of current interface usage of the MN by setting the HO. The HO may be obtained by extending the RS message. For example, the HO may be obtained by adding a corresponding flag or a new option to the RS message.

The following describes the addition of a corresponding flag to the RS message. For example, the HO flag may be set in the "reserve" field of the RS message. The HO may be set to different values to indicate different cases. For example, the HO is in the type, length, and value (TLV) format. The corresponding flags or values are defined as follows:

If the HO is set to "1", it indicates an attachment over a new interface.

If the HO is set to "2", it indicates a handover between different interfaces of the MN.

If the HO is set to "3", it indicates a handover between different MAGs over a same interface.

If the HO is set to "4", it indicates that the handover state is unknown.

If the HO is set to "5", it indicates that the handover state does not change (then, re-registration is executed).

The foregoing HO values can be set according to the actual situation. The HO in the TLV format serves as only an example.

301. The new MAG determines a handover indication option value according to the interface handover indication information.

For example, if the HO value of the interface handover indication information is "1", it indicates an attachment over a new interface. The attachment over a new interface includes two cases: an attachment over new interface b of the MN that has accessed the MAG on the PMIPv6 network, or an attachment over new interface a of a new MN that has not accessed the MAG on the PMIPv6 network. In this case, the MAG can set the handover indication option value to "1".

If the HO value of the interface handover indication information is "2", it indicates a handover between different interfaces of the MN. The handover between different interfaces of the MN includes two cases: a handover from interface a of the MN to interface b of the MN to connect to the MAG, or a handover from interface a of the MN to interface b of the MN to connect to a new MAG other than an old MAG. In this case, the MAG can set the handover indication option value to "2".

If the HO value of the interface handover indication information is "3", it indicates a handover between different MAGs over a same interface. The handover may be a handover from an old MAG to a new MAG over a same interface. In this case, the MAG can set the handover indication option value to "3".

FIG. 3 shows a handover of an MN from an old MAG to a new MAG. In this case, the HO can be set to "2", which indicates a handover from interface a of the MN to interface b of the MN to connect to a new MAG other than an old MAG. The HO may also be set to "3", which indicates a handover from an old MAG to a new MAG over interface a of the MN. The MAG sets the handover indication option value according to the HO value. The handover indication option value may be a value that is the same as the HO value, or may be represented by an identifier.

302. The new MAG sends a PBU message to the LMA, where the PBU message includes the handover indication option value.

According to the HO value in the interface handover indication information, the MAG sets the handover indication option value, generates a PBU message carrying the handover indication option value, and sends the PBU message to the LMA.

303. The new MAG receives a PBA message sent by the LMA, where the PBA message carries an HNP of the MN.

After receiving the PBU message sent by the MAG, the LMA updates its binding information according to the handover indication option value carried in the PBU message, allocates an HNP to an interface of the MN, generates a PBA message carrying the HNP, and sends the PBA message to the MAG.

For example, according to the foregoing meaning of the HO, the LMA performs one of the following operations after receiving the PBA message sent by the MAG:

When the HO is set to "1", the LMA allocates a unique HNP to the MN and creates a binding cache entry.

When the HO is set to "2", the LMA compares the PBU message with a maintained binding cache entry of the MN and allocates an HNP that is the same as the HNP before a handover to the MN through a PBA message (that is, before and after the handover, different interfaces of the MN use a same prefix).

When the HO is set to "3", the LMA compares the PBU message with a maintained binding cache entry of the MN and allocates an HNP that is the same as the HNP before a handover to the MN through a PBA message (that is, before and after the handover, the same interface of the MN uses a same prefix).

When the HO is set to "4", the LMA allocates a corresponding prefix to the MN according to the situation.

When the HO is set to "5", the LMA updates the lifetime of a corresponding binding cache entry.

Then, the MAG receives the PBA message sent by the LMA and generates an RA message according to the HNP carried in the PBA message.

304. The new MAG sends the RA message to the MN, where the RA message carries an HNP of the MN.

In the second embodiment of the method for processing handover state information, an MN sends an RS message carrying interface handover indication information to a MAG to notify the MAG of a handover state of the MN. The MAG receives the RS message and configures a PBU message according to the interface handover indication information. At the network layer of the PMIPv6 network, the MAG can obtain handover state information when the MN performs a handover. The network access success probability of a user is increased; therefore, the QoS is improved.

Figure 4:
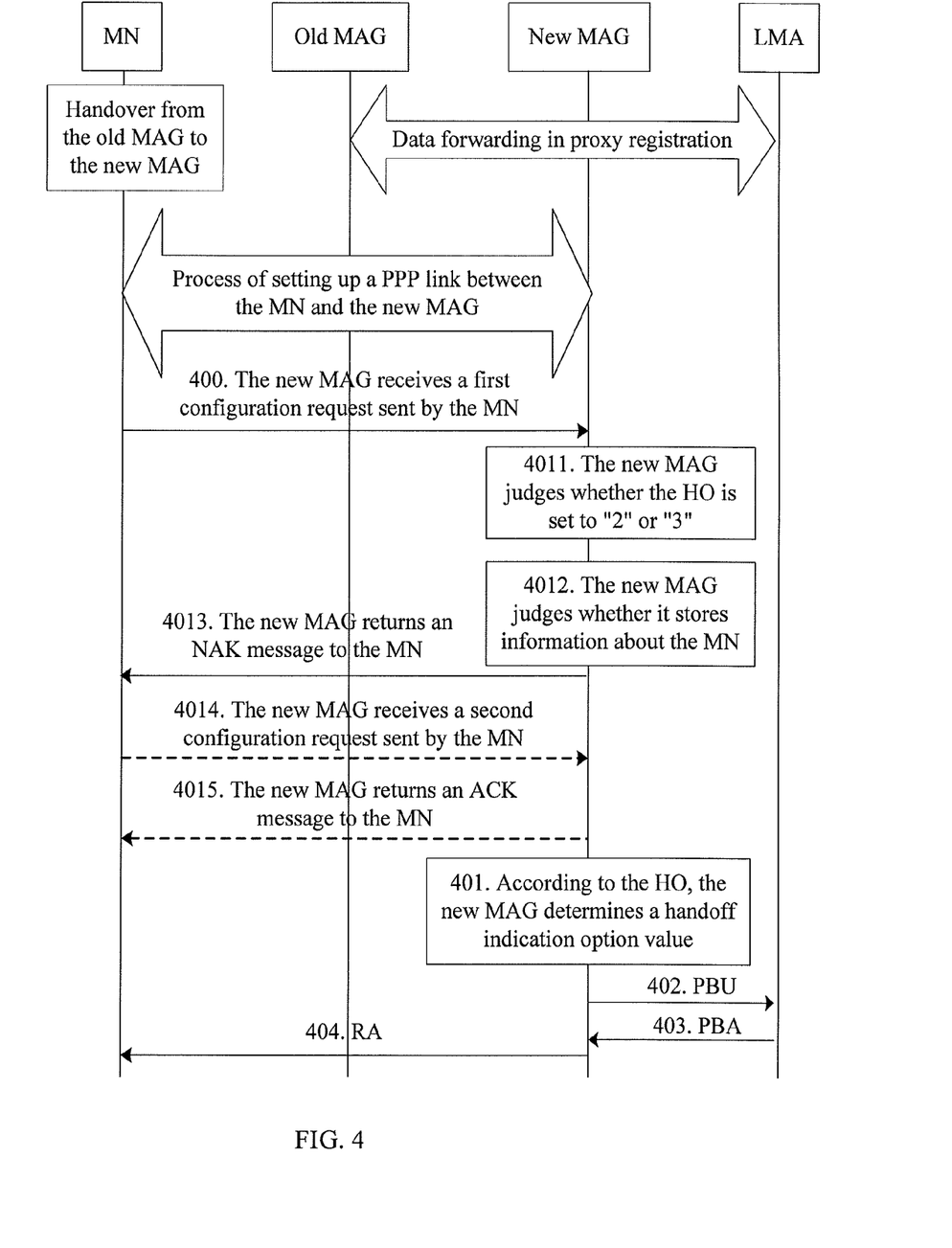
FIG. 4 is a signaling flowchart of a method for processing handover state information according to a third embodiment of the present disclosure.

FIG. 4 is a signaling flowchart of a method for processing handover state information according to a third embodiment of the present invention. The mapping relationship between the embodiment and the first embodiment of the method for processing handover state information is as follows: An MN is a mobile node; a MAG is a mobile access gateway; a configuration request is a handover state notification message; an HO is interface handover indication information; a HoA is a HoA used before a handover of an MN; and an LMA is a local mobility anchor.

As shown in FIG. 4, the method for processing handover state information includes:

400. A new MAG receives a first configuration request, where the first configuration request carries interface handover indication information (HO).

The first configuration request carries related options defined in IPv6CP (RFC 1332 and RFC 5072) and an HO. The HO values may be defined according to the TLV format described in the second embodiment. In addition, the meanings of the HO values in the embodiment are the same as those in the second embodiment.

401. According to the interface handover indication information (HO), the new MAG determines a handover indication option value.

After the MAG receives the first configuration request carrying the interface handover indication information (HO) and before the MAG determines a handover indication option value according to a value of the HO, the operations may include:

4011. The new MAG judges a value of the HO. If the HO is set to "2" or "3", the new MAG proceeds to 4012; otherwise, the new MAG proceeds to 4015.

4012. The new MAG judges whether it stores information about the MN (including a HoA and an HNP used before a handover of the MN). If it stores the information, the new MAG proceeds to 4013; otherwise, the new MAG proceeds to 4015.

4013. The new MAG returns a PPP NAK message to the MN, where the PPP NAK message carries an IP address that is the HoA used before a handover of the MN.

4014. The new MAG receives a second configuration request sent by the MN, where the configuration request carries a value of the HO and an IP address that is the HoA used before a handover of the MN.

4015. The new MAG returns an ACK message to the MN.

After step 401, the operations may further include:

402. The new MAG generates a PBU message carrying the handover indication option value, and sends the PBU message to an LMA.

403. The new MAG receives a PBA message carrying an HNP of the MN from the LMA.

404. The new MAG sends an RA message carrying an HNP of the MN to the MN.

The foregoing third embodiment of the method for processing handover state information is applicable to a network environment where PPP is used for setting up a link-layer connection. As a link-layer protocol that carries data packets at the network layer on a point-to-point link, PPP is at the second layer of a TCP/IP protocol stack. PPP is designed to support point-to-point data transmission on full-duplex synchronous and asynchronous links. PPP defines a suite of protocols. There are three protocol families, namely, a link control protocol family, a network control protocol family, and a PPP extension protocol family. The link control protocol family is used for setting up, tearing down, and monitoring PPP data links and negotiating certain link attributes. The network control protocol family is used for negotiating the type of a data packet at the network layer transmitted on the data link and certain attributes of a network-layer protocol (for example, IPCP needs to negotiate an IP address). The PPP extension protocol family is used for providing further support for the PPP function. Actually, it provides certain feature services, and designs certain extension protocols according to a PPP framework, such as an authentication protocol used for network security.

In the third embodiment of the method for processing handover state information, an MN sends a first configuration request carrying interface handover indication information to a MAG to notify the MAG of a handover state of the MN. After receiving the first configuration request, the MAG judges whether the MAG stores information about the MN, such as a HoA. If the MAG stores such information, the MAG judges whether the interface handover indication information carried in the first configuration request identifies a handover from a first interface of the MN to a second interface of the MN (corresponding to the case that the HO is set to "2" in the second embodiment) or a handover between different MAGs over a same interface (corresponding to the case that the HO is set to "3" in the second embodiment, that is, a handover of the MN from an old MAG to a new MAG shown in FIG. 4). If yes, the MAG returns a HoA used before the handover of the MN to the MN. This operation can be implemented by returning a PPP NAK message carrying the HoA used before the handover of the MN. The first configuration request may not carry the HoA used before the handover of the MN or address information carried in the first configuration request may not be equal to the HoA used before the handover of the MN. Therefore, the MAG needs to return an NAK message to the MN. In addition, the MN needs to send a second configuration request carrying the HoA used before the handover of the MN to the MAG. When the HoA carried in the second configuration request matches the HoA used before the handover of the MN and stored on the MAG, the MAG returns an ACK of the second configuration request to the MN, indicating that the request is successful. The MAG configures a handover indication option value carried in a PBU message, and then sends the PBU message to the LMA. The LMA returns a PBA message, carrying an HNP allocated to the MN, to the MAG. The MAG returns an RA message, carrying the HNP, to the MN. In this case, the MN can check whether a HoA on the MN is correct according to the HNP carried in the RA message. If the HoA is incorrect, the MN re-configures a HoA according to the HNP. When the MAG is not stored with a state of information about the MN (for example, the value of the HO is "1"), the MAG configures the handover indication option value carried in a PBU message, and then sends the PBU message to the LMA. The LMA returns a PBA message, carrying an HNP allocated to the MN, to the MAG. The MAG returns an RA message carrying the HNP to the MN. In this case, the MN configures a new HOA according to the HNP carried in the RA message. After determining the HoA according to the HNP carried in the RA message, the MN performs communication according to the HoA.

In the third embodiment of the method for processing handover state information, a MAG can obtain the handover state information of an MN at the link layer according to interface handover indication information of the MN. The access success probability for a user is improved, and the communication is smooth; therefore, the QoS is improved.

Persons of ordinary skills in the art may understand that all or part of the steps of the method according to the embodiments of the present invention may be implemented by a program instructing relevant hardware. The program may be stored in a computer readable storage medium. When the program is executed, the steps of the foregoing method embodiment are performed. The storage medium may be a magnetic disk, a read only memory (ROM) or a random access memory (RAM), or a compact disk-read only memory (CD-ROM).

Figure 5:
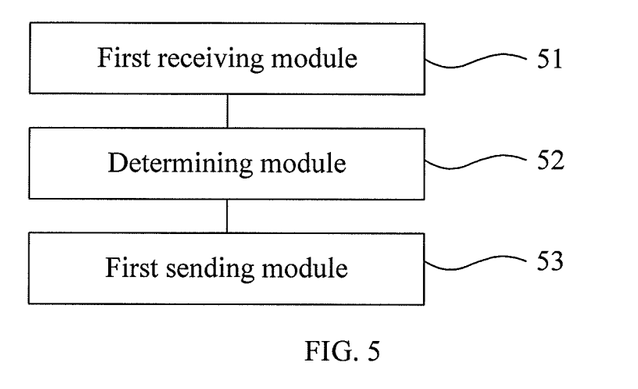
FIG. 5 shows the structure of a MAG according to a first embodiment of the present disclosure.

FIG. 5 shows the structure of a MAG according to a first embodiment of the present invention. As shown in FIG. 5, the MAG includes a first receiving module 51, a determining module 52, and a first sending module 53. The first receiving module 51 is configured to receive a handover state notification message, where the handover state notification message includes interface handover indication information. The determining module 52 is connected to the first receiving module 51 and is configured to determine a handover indication option value according to the interface handover indication information. The first sending module 53 is connected to the determining module 52 and is configured to generate and send a PBU message, where the PBU message includes the handover indication option value.

Specifically, after the first receiving module 51 in the MAG receives a handover state notification message carrying interface handover indication information sent by an MN, the determining module 52 determines a handover indication option value according to the interface handover indication information, and the first sending module 53 sends a PBU message carrying the handover indication option value obtained by the determining module 52 to an LMA to request the LMA to allocate an HNP according to a handover state of the MN. The MAG forwards the HNP to the MN. The MN re-configures information about an interface to ensure normal communication.

Before the MAG provided in the embodiment of the present invention sends a PBU message to an LMA, an MN sends a handover state notification message carrying interface handover indication information. According to the interface handover indication information, the MAG determines a handover state of the MN and configures a handover indication option value to accurately report handover state information of the MN to the LMA for proxy update. Thus, smooth communication after the interface handover of the MN is ensured, and the QoS is improved.

Figure 6:
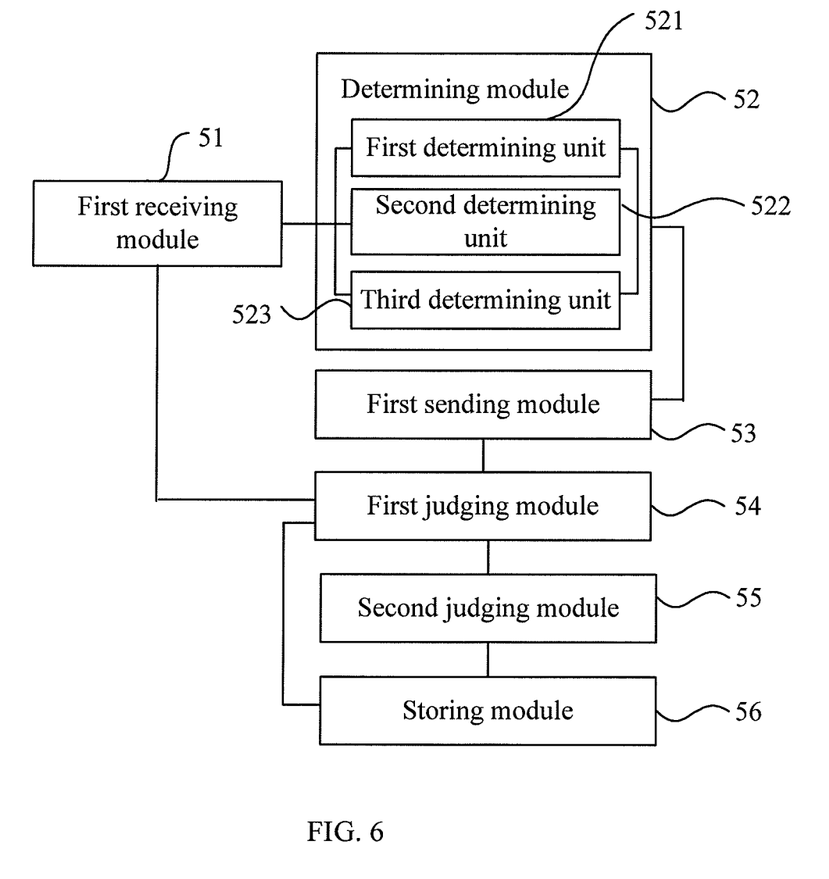
FIG. 6 shows the structure of a MAG according to a second embodiment of the present disclosure.

FIG. 6 shows the structure of a MAG according to a second embodiment of the present invention. As shown in FIG. 6, based on the first embodiment of a MAG, the MAG includes a first receiving module 51, a determining module 52, and a first sending module 53. The determining module 52 includes a first determining unit 521, a second determining unit 522, and a third determining unit 523. The first determining unit 521 is configured to determine a handover indication option value according to the interface handover indication information that identifies an attachment over a new interface, and the handover indication option value is used for instructing an LMA to allocate a unique HNP to the MN. The second determining unit 522 is configured to determine a handover indication option value according to the interface handover indication information that identifies a handover from a first interface of the MN to a second interface of the MN, and the handover indication option value is used for instructing an LMA to allocate a same HNP used by the first interface to the MN. The third determining unit 523 is configured to determine a handover indication option value according to the interface handover indication information that identifies a handover between different MAGs over a same interface, and the handover indication option value is used for instructing an LMA to allocate a same HNP used by the same interface to the MN.

According to the interface handover indication information sent by the MN, the determining module 52 uses a corresponding functional module to determine a handover indication option value. When the interface handover indication information sent by the MN identifies an attachment over a new interface, the first determining unit 521 determines a handover indication option value as a specific information value that can instruct an LMA to allocate a unique HNP to the MN; when the interface handover indication information sent by the MN identifies a handover from a first interface of the MN to a second interface of the MN, the second determining unit 522 determines a handover indication option value as a specific information value that can instruct an LMA to allocate a same HNP used by the first interface to the MN; and when the interface handover indication information sent by the MN identifies a handover between different MAGs over a same interface, the third determining unit 523 determines a handover indication option value as a specific information value that can instruct an LMA to allocate a same HNP used by the same interface to the MN.

The handover state notification message sent by the MN may be an RS message or a first configuration request. Regardless of a message type used by the MN to send a handover state notification message, the determining module can determine a handover indication option value carried in a PBU message that is sent to the LMA. When the MN sends the first configuration request, the MAG in the embodiment of the present invention may further include a first judging module 54 and a second judging module 55. The first judging module 54 is connected to the first receiving module 51 and is configured to judge whether the MAG stores a HoA used before a handover of the MN. The second judging module 55 is connected to the first judging module 54 and is configured to judge a type of the interface handover indication information when the MAG stores the HoA.

The MAG in the embodiment of the present invention may further include a storing module 56, configured to store a HoA of the MN. The first judging module 54 judges whether the MAG stores a HoA used before a handover of the MN according to the HoA stored in the storing module 56. The second judging module 55 judges whether the interface handover indication information identifies a handover from a first interface of the MN to a second interface of the MN or a handover between different MAGs over a same interface. The judgment process of the first judging module 54 may be performed before, during or after the judgment process of the second judging module 55. The first sending module 53 sends the HoA to the MN. The storing module 56 is further configured to store an HNP of the MN. After the MAG sends a PBU message carrying an acknowledged handover indication option value to the LMA and the first receiving module 51 receives a PBA message carrying the HNP returned by the LMA, the MAG sends an RA message carrying the HNP to the MN. In the forwarding process, the MAG may further store the HNP to the storing module 56.

A MAG provided in the embodiment of the present invention can determine a handover indication option value according to interface handover indication information sent by an MN and send the handover indication option value to an LMA to perform proxy update. In the precondition that the obtained handover state information is accurate, the communication is smooth, and the QoS is improved when an interface handover of an MN occurs.

Figure 7:
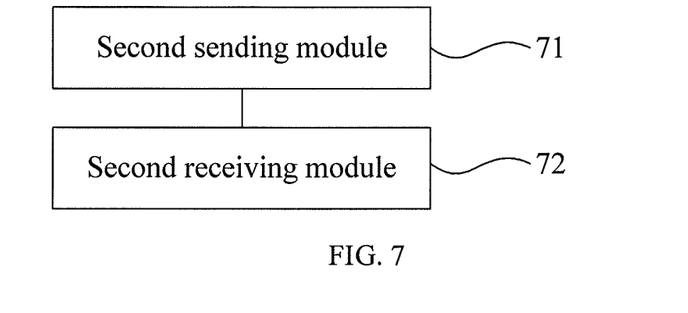
FIG. 7 shows the structure of an MN according to a first embodiment of the present disclosure.

FIG. 7 shows the structure of an MN according to a first embodiment of the present invention. As shown in FIG. 7, the MN includes a second sending module 71 and a second receiving module 72. The second sending module 71 is configured to send a handover state notification message, where the handover state notification message includes interface handover indication information. The second receiving module 72 is configured to receive an RA message returned according to the interface handover indication information, where the RA message carries an HNP allocated to the MN.

Specifically, the second sending module 71 of the MN sends a handover state notification message carrying interface handover indication information to a MAG. After the MAG sends a PBU message configured according to the interface handover indication information to the LMA and receives an HNP of the MN allocated according to the PBU message and sent by the LMA, the second receiving module 72 receives an RA message carrying the HNP that is sent by the MAG.

An MN provided in the embodiment can generate a handover state notification message when a handover occurs, where the handover state notification message carries interface handover indication information that may indicate a handover state of the MN, and send the handover state notification message carrying the interface handover indication information to a MAG, so that the MAG configures a PBU message according to the interface handover indication information and sends the PBU message to an LMA, and that the LMA allocates an HNP to the MN. After an interface handover of the MN occurs, the MAG can conveniently obtain the handover state information. Therefore, a high user access success probability is ensured, and the QoS is improved.

Figure 8:
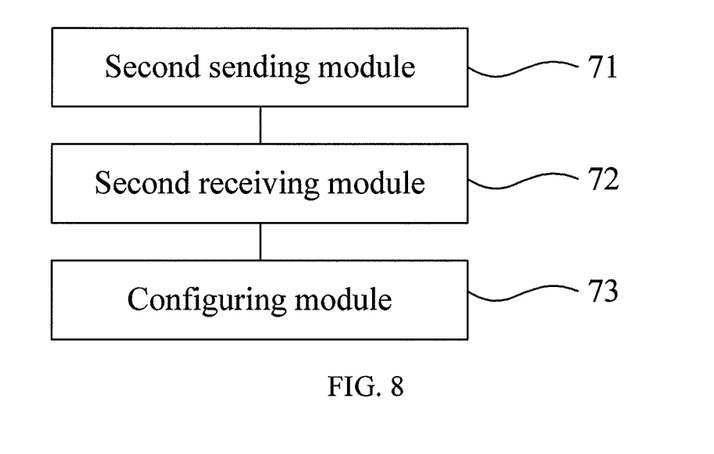
FIG. 8 shows the structure of an MN according to a second embodiment of the present disclosure.

FIG. 8 shows the structure of an MN according to a second embodiment of the present invention. As shown in FIG. 8, based on the first embodiment of an MN, the MN includes a second sending module 71, a second receiving module 72, and a configuring module 73. The second sending module 71 is configured to send a handover state notification message. The handover state notification message includes interface handover indication information and address information used for the interface. The handover state notification message may be an RS message or a first configuration request. The configuring module 73 is connected to the second receiving module 72 and is configured to configure a HoA for an interface of the MN according to a received HoA allocated to the MN.

When the MN sends the first configuration request, the second receiving module 72 is further configured to return a PPP NAK message according to the interface handover indication information. The NAK message includes a HoA used before a handover of the MN. The NAK message indicates that the handover state notification request sent from the MN to a MAG fails. In this case, the second sending module 71 sends a second configuration request that is generated according to the HoA carried in the NAK message to the MAG. The second configuration request includes the interface handover indication information and a HoA used before a handover of the MN. The second receiving module 72 receives an ACK of the second configuration request sent by the MAG. The ACK message indicates that the handover state notification request sent from the MN to a MAG is successful.

After the second receiving module 72 receives the ACK message returned by the MAG, the MAG sends a PBU message to an LMA, receives an HNP of the MN allocated according to the PBU message and sent by the LMA, and sends an RA message carrying the HNP to the MN. The second receiving module 72 receives the RA message carrying the HNP that is sent by the MAG. The configuring module 73 configures a HoA of the MN according to the HoA received by the second receiving module 72.

An MN provided in the embodiment can generate a handover state notification message when a handover occurs, where the handover state notification message carries interface handover indication information that may indicate a handover state of the MN, send the handover state notification message carrying the interface handover indication information to a MAG, and after receiving an HNP allocated by an LMA, configure a HoA for the MN according to the HNP. When a handover of the MN occurs, the handover state of the MN can be notified to the MAG to ensure smooth communication after the handover and to improve the QoS.

It should be noted that the above embodiments are merely provided for elaborating on the technical solution of the present invention, but not intended to limit the present invention. Although the present invention has been described in detail with reference to the foregoing embodiments, it is apparent that persons having ordinary skills in the art may make modifications to the technical solution described in the above embodiments, or may make equivalent replacements to some of the technical features without departing from the spirit and scope of the embodiments of the present invention.

What is claimed is:

1. A method for processing handover state information, comprising:

receiving, by a mobile access gateway (MAG), a handover state notification message from a mobile node (MN) that has accessed the MAG, wherein the handover state notification message is a Point-to-Point Protocol (PPP) configuration request message, the handover state notification message comprises a Internet Protocol version 6 Control Protocol (IPv6CP) Header, the IPv6CP Header comprises interface handover indication information, and the interface handover indication information is a HO flag, the HO flag is in a type, length, and value (TLV) format, the value of the HO flag is one of "1", "2" and "3", wherein if the HO is set to "1", it indicates an attachment of the MN over a new interface, if the HO is set to "2", it indicates a handover between different interfaces of the MN, if the HO is set to "3", it indicates a handover between different MAGs over a same interface;

determining, by the MAG, when the value of the HO flag is "1", a handover indication option value that is used for instructing a local mobility anchor (LMA) to allocate, to the MN, a new unique home network prefix (HNP) that is different from an existing HNP used by a existing interface through which the MN accesses the MAG;

determining, by the MAG, when the value of the HO flag is "2", a handover indication option value that is used for instructing the LMA to allocate a same HNP used by the existing interface to the MN;

determining, by the MAG, when the value of the HO flag is "3", a handover indication option value that is used for instructing the LMA to allocate a same HNP used by the same interface between different MAGs to the MN; and generating and sending, by the MAG, a proxy binding update (PBU) message to the LMA, wherein the PBU message comprises the handover indication option value.

2. A mobile access gateway (MAG), comprising:

a first receiving module, configured to receive a handover state notification message from a mobile node (MN) that has accessed the MAG, wherein the handover state notification message is a Point-to-Point Protocol (PPP) configuration request message, the handover state notification message comprises a Internet Protocol version 6 Control Protocol (IPv6CP) Header, the IPv6CP Header comprises interface handover indication information, and the interface handover indication information is a HO flag, the HO flag is in a type, length, and value (TLV) format, the value of the HO flag is one of "1", "2" and "3", wherein if the HO is set to "1", it indicates an attachment of the MN over a new interface, if the HO is set to "2", it indicates a handover between different interfaces of the MN, if the HO is set to "3", it indicates a handover between different MAGs over a same interface;

a determining module, configured to determine, when the value of the HO flag is "1", a handover indication option value that is used for instructing a local mobility anchor (LMA) to allocate, to the MN, a new unique home network prefix (HNP) that is different from an existing HNP used by a existing interface through which the MN accesses the MAG, determine, when the value of the HO flag is "2", a handover indication option value that is used for instructing the LMA to allocate a same HNP used by the existing interface to the MN, and determine, when the value of the HO flag is "3", a handover indication option value that is used for instructing the LMA to allocate a same HNP used by the same interface between different MAGs to the MN; and a first sending module, configured to generate and send a proxy binding update (PBU) message to the LMA, wherein the PBU message carries the handover indication option value.

3. A mobile node (MN), the MN has accessed a mobile access gateway (MAG), the MN comprising:

a sending module, configured to send a handover state notification message, wherein the handover state notification message is a Point-to-Point Protocol (PPP) configuration request message, the handover state notification message comprises a Internet Protocol version 6 Control Protocol (IPv6CP) Header, the IPv6CP Header comprises interface handover indication information, and the interface handover indication information is a HO flag, the HO flag is in a type, length, and value (TLV) format, the value of the HO flag is one of "1", "2" and "3", wherein when the HO is set to "1", it indicates an attachment of the MN over a new interface, when the HO is set to "2", it indicates a handover between different interfaces of the MN, when the HO is set to "3", it indicates a handover between different MAGs over a same interface; and a receiving module, configured to receive a router advertisement (RA) message returned according to the interface handover indication information, wherein the RA message carries a home network prefix (HNP).

* * * * *